(12) United States Patent
Lai (10) Patent No.: US 11,269,797 B2
(45) Date of Patent: Mar. 8, 2022

(54) METHOD AND SYSTEM FOR CONTROLLING DATA RESPONSE WITH AID OF ATTRIBUTE OF TRANSACTION IDENTIFIER

(71) Applicant: Realtek Semiconductor Corp., HsinChu (TW)

(72) Inventor: Chi-Shao Lai, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/105,467

(22) Filed: Nov. 25, 2020

(65) Prior Publication Data
US 2021/0294765 A1  Sep. 23, 2021

(30) Foreign Application Priority Data
Mar. 19, 2020  (TW) ................................ 109109187

(51) Int. Cl.
| *G06F 13/16* | (2006.01) |
| *G06F 13/362* | (2006.01) |
| *G06F 9/38* | (2018.01) |
| *G06F 9/46* | (2006.01) |

(52) U.S. Cl.
CPC .......... *G06F 13/362* (2013.01); *G06F 9/3855* (2013.01); *G06F 9/466* (2013.01); *G06F 13/1673* (2013.01)

(58) Field of Classification Search
None
See application file for complete search history.

(56) References Cited

U.S. PATENT DOCUMENTS

| 10,282,109 B1* | 5/2019 | Teh ..................... G06F 13/1605 |
| 2003/0005119 A1* | 1/2003 | Mercier ................... H04L 29/06 |
| | | 709/225 |
| 2004/0017820 A1* | 1/2004 | Garinger ................. H04L 49/30 |
| | | 370/419 |
| 2004/0203800 A1* | 10/2004 | Myhre ................... H04W 88/06 |
| | | 455/445 |
| 2005/0135415 A1* | 6/2005 | Fan ....................... H04L 69/163 |
| | | 370/468 |
| 2011/0208948 A1* | 8/2011 | Knight ................. G06F 11/1497 |
| | | 712/31 |
| 2015/0006244 A1* | 1/2015 | Tietzen .............. G06Q 30/0201 |
| | | 705/7.29 |
| 2015/0012679 A1* | 1/2015 | Davis ..................... G06F 13/364 |
| | | 710/110 |
| 2016/0019151 A1* | 1/2016 | Venkatasubramanian ................... |
| | | G06F 9/38 |
| | | 711/122 |

* cited by examiner

*Primary Examiner* — Hyun Nam
(74) *Attorney, Agent, or Firm* — Winston Hsu (57) ABSTRACT

A method and a system for controlling data response with the aid of at least one attribute of a transaction identifier (ID) are provided. The method includes: transmitting the at least one attribute in conjunction with the transaction ID from any master device within one or more master devices to a slave device; and according to the at least one attribute, determining whether to utilize a specific data path among multiple data paths for sending response data corresponding to the transaction ID from a memory device within the slave device to the aforementioned master device. More particularly, the specific data path is a data path having maximum transmission efficiency among the multiple data paths.

16 Claims, 8 Drawing Sheets

METHOD AND SYSTEM FOR CONTROLLING DATA RESPONSE WITH AID OF ATTRIBUTE OF TRANSACTION IDENTIFIER

BACKGROUND OF THE INVENTION

1. Field of the Invention

The present invention is related to data response control, and more particularly, to a method and a system for controlling data response with the aid of at least one attribute of a transaction identifier (ID).

2. Description of the Prior Art

Read re-order buffers (RRBs) may be installed in many transmission interfaces within a system, and allow the system to perform re-ordering of multiple independent commands that are sent concurrently, in order to achieve optimal response efficiency. Although a specific command is independent from the other commands, allowing these commands to undergo re-ordering, response data of the specific command might still be obstructed by response data of the other commands, which greatly increases data response times.

Thus, there is a need for a novel data response control mechanism and associated system, to allow response data of specific commands that are independent from other commands not to be obstructed by response data of the other commands, in order to achieve optimal data response efficiency.

SUMMARY OF THE INVENTION

An objective of the present invention is to provide a method and a system for controlling data response with the aid of at least one attribute of a transaction identifier (ID), to prevent response data of specific commands that are independent from other commands from being obstructed by response data of the other commands, to thereby achieve optimal data response efficiency.

At least one embodiment of the present invention provides a method for controlling data response with the aid of at least one attribute of a transaction ID. The method comprises: transmitting the at least one attribute in conjunction with the transaction ID from any master device among one or more master devices to a slave device; and according to the at least one attribute, determining whether to utilize a specific data path among multiple data paths for sending response data corresponding to the transaction ID from a memory device within the slave device to said any master device. For example, the specific data path is a data path having maximum transmission efficiency among the multiple data paths.

At least one embodiment of the present invention provides a system for controlling data response with the aid of at least one attribute of a transaction ID. The system comprises a slave device and one or more master devices, wherein the one or more master devices are coupled to the slave device through a transmission interface circuit. The slave device may comprise a memory device configured for storing data. The one or more master devices may obtain the data stored in the memory device through the transmission interface circuit. In particular, any master device among the one or more master devices may transmit the at least one attribute in conjunction with the transaction ID to the slave device; and according to the at least one attribute, the slave device may determine whether to utilize a specific data path among multiple data paths for sending response data corresponding to the transaction ID from the memory device to said any master device. For example, the specific data path is a data path having maximum transmission efficiency among the multiple data paths.

The method and the system provided by embodiments of the present invention can transmit a transaction ID in conjunction with an attribute thereof, for determining whether to utilize a bypass path to optimize efficiency of data response. In comparison with the related art, the embodiments of the present invention will not greatly increase additional costs. Thus, the present invention can solve the problem of the related art without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
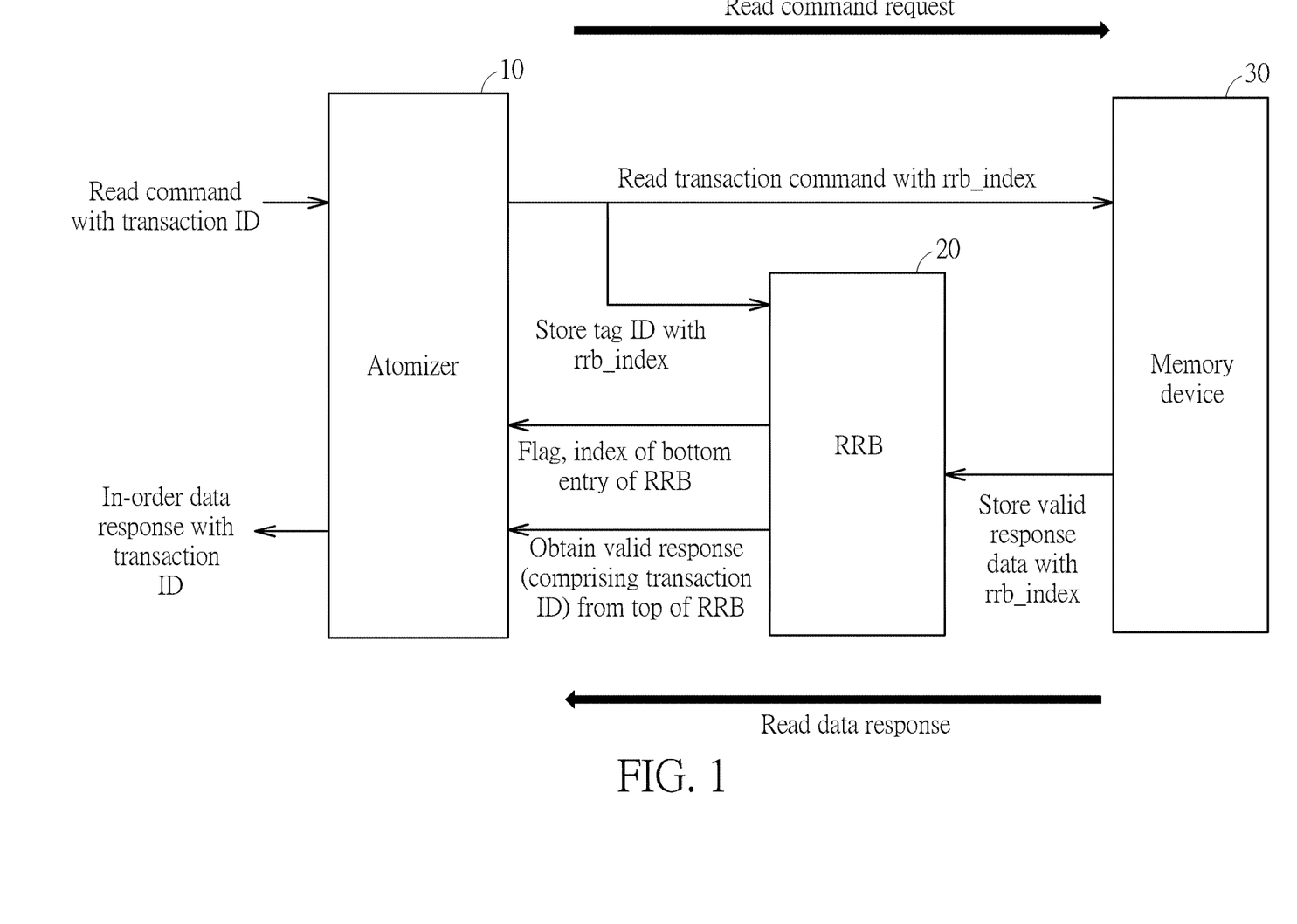
FIG. 1 illustrates some implementation details of a read re-order buffer (RRB) in a read operation according to an embodiment of the present invention.

FIG. 1 illustrates some implementation details of a read re-order buffer (RRB) 20 in a read operation according to an embodiment of the present invention, where the RRB 20 may be coupled between an atomizer 10 and a memory device 30. As shown in FIG. 1, an arrow labeled "Read command request" may represent a direction of the read command request within the read operation, and an arrow labeled "Read data response" may represent a direction of the read data response within the read operation. Under a condition where the memory device 30 performs access control with a fixed burst length (e.g. by receiving commands with the fixed burst length), the atomizer 10 reads a command with a transaction identifier (ID) (e.g. a tag ID), and further chops the transaction ID to generate multiple transaction commands (e.g. burst chop commands) with the fixed burst length, where each of the multiple transaction commands is provided with an index rrb_index, and then the transaction ID with the index rrb_index is stored into the RRB 20. The memory device 30 may read a transaction command with the index rrb_index and accordingly respond with valid data with the index rrb_index, to allow the RRB 20 to store valid response data with the index rrb_index, wherein the memory device 30 may send response data in an out-of-order manner to optimize overall read performance (e.g. minimize read delay time and increase usage rate of dynamic out-of-order access). Examples of the memory device 30 may include a random access memory (RAM) such as a static RAM (SRAM) and a dynamic RAM (DRAM). In some embodiments, the RRB 20 may be implemented by a first in first out (FIFO) buffer. The atomizer 10 may obtain a tag such as a flag of a bottom entry of the RRB 20 and an index of this bottom entry (labeled "Flag, index of bottom entry of RRB" in FIG. 1), and obtain the valid response comprising the transaction ID from a top (e.g. top entry) of the RRB 20 (labeled "Obtain valid response (comprising transaction ID) from top of RRB" in FIG. 1), to allow the atomizer 10 to send response data with the transaction ID in an in-order manner.

In some embodiments, the memory device 30 may perform access control with different burst lengths, so the atomizer 10 may be replaced with a wrapper in order to transmit a whole command to the memory device 30 without chopping the transaction ID, but the present invention is not limited thereto. For better comprehension, the following embodiments are illustrated by the condition where the memory device 30 performs access control with the fixed burst length.

Figure 2:
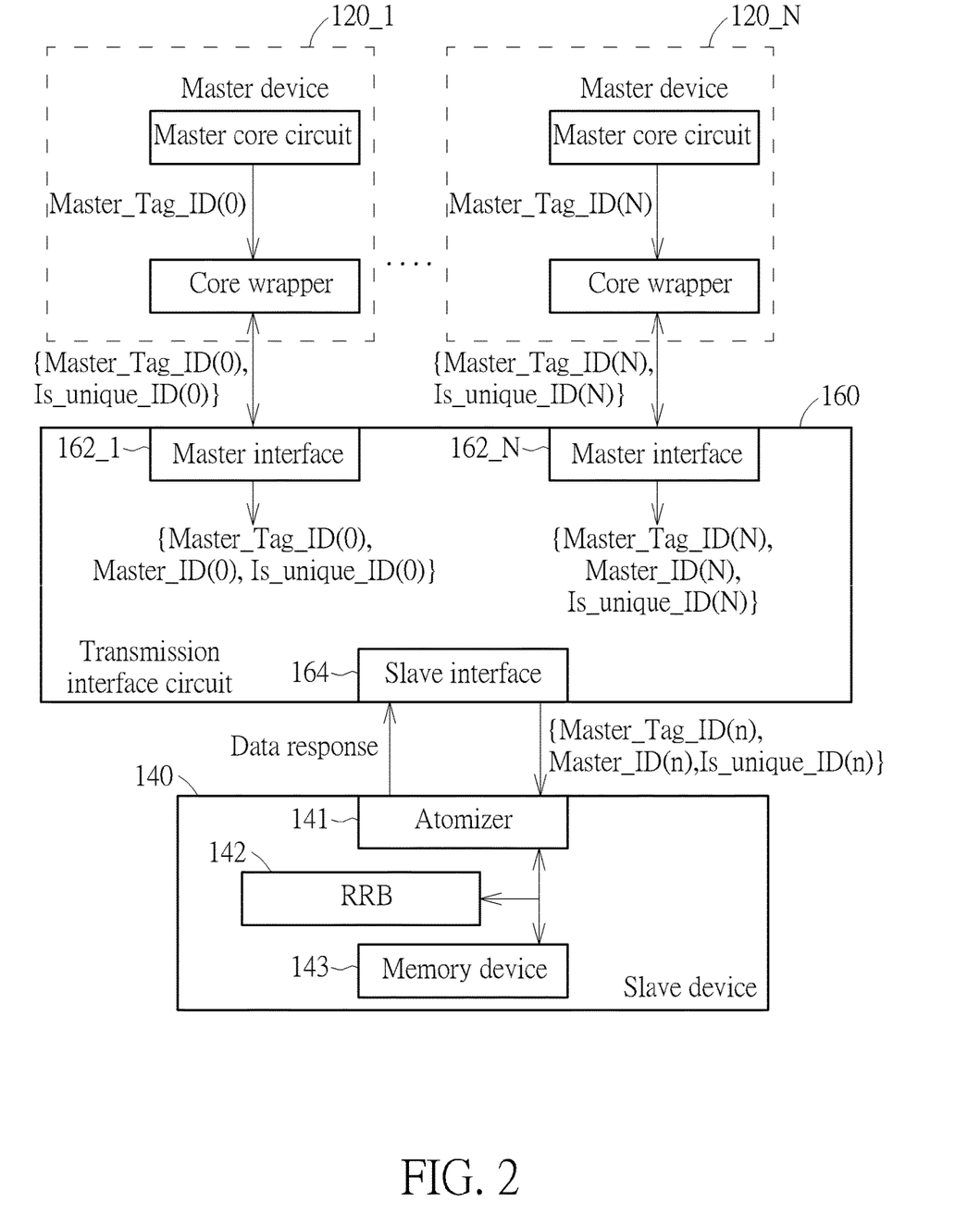
FIG. 2 is a diagram illustrating a system for controlling data response with the aid of at least one attribute of a transaction ID according to an embodiment of the present invention.

FIG. 2 is a diagram illustrating a system 100 for controlling data response with the aid of at least one attribute of a transaction ID according to an embodiment of the present invention. As shown in FIG. 2, the system 100 may comprise a slave device 140 and one or more master devices such as N master devices 120_1, . . . and 120_N, where N is a positive integer. The slave device 140 may comprise an atomizer 141, an RRB 142 and a memory device 143, where the atomizer 10, the RRB 20 and the memory device 30 shown in FIG. 1 may be examples of the atomizer 141, the RRB 142 and the memory device 143, respectively. In this embodiment, the memory device 143 may be configured to store data, and the one or more master devices such as the master devices 120_1, . . . and 120_N may be coupled to the slave device 140 through a transmission interface 160 (e.g. Network-on-Chip (NoC) or bus/interconnection circuit), to obtain the data stored in the memory device 143. For example, the master device 120_1 may be coupled to the transmission interface circuit 160 through a master interface 162_1 (e.g. a master agent), the master device 120_N may be coupled to the transmission interface circuit 160 through a master interface 162_N (e.g. a master agent), and the slave device 140 may be coupled to the transmission interface circuit 160 through a slave interface 164 (e.g. a slave agent), but the present invention is not limited thereto. In this embodiment, any master device (e.g. a master device 120_n, where n is any integer between 1 and N) among the master devices 120_1, . . . and 120_N may transmit the at least one attribute in conjunction with the transaction ID to the slave device 140. For example, the master device 120_1 may utilize a master core circuit therein to send a transaction ID (e.g. a tag ID) Master_Tag_ID(0), and utilize a core wrapper therein to add an attribute Is_unique_ID(0) of the transaction ID Master_Tag_ID(0) by an extension field, where the master interface 162_1 may further add an attribute Master_ID(0) of the transaction ID Master_Tag_ID(0) by an extension field; deduced by analogy, the master device 120_N may utilize a master core circuit therein to send a transaction ID (e.g. a tag ID) Master_Tag_ID(N), and utilize a core wrapper therein to add an attribute Is_unique_ID(N) of the transaction ID Master_Tag_ID(N) by an extension field, where the master interface 162_N may further add an attribute Master_ID(0) of the transaction ID Master_Tag_ID (0) by an extension field. A transaction ID Master_Tag_ID (n) may represent a transaction ID sent from a master core circuit within the master device 120_n, an attribute Is_unique_ID(n) may indicate whether the transaction ID Master_Tag_ID(n) is unique in the whole system 100, and an attribute Master_ID(n) may indicate that the transaction ID Master_Tag_ID(n) is sent from the master device 120_n.

In detail, if two transaction IDs are the same, this means response data corresponding to these two transaction IDs have to be in-order (e.g. the response data should be sent in a predetermined order); and if these two transaction IDs are different, it means response data corresponding to these two transaction IDs may be re-ordered (e.g. the response data does not have to be sent in the predetermined order) to optimize efficiency of data response. When a certain command has a requirement of quickly obtaining response data, a system developer may provide this command with a unique ID, which means the response data corresponding to this ID may be re-ordered, to send the response data under a condition of a minimized delay time.

To make the slave device 140 be able to determine whether the transaction ID Master_Tag_ID(n) is unique in the system 100 without having a built-in lookup table, the master device 120_n may transmit the attribute Is_unique_ID(n) in conjunction with the transaction ID Master_Tag_ID(n) from the master device 120_n to the slave device 140. According to the attribute Is_unique_ID(n), the slave device 140 may determine whether to utilize a specific data path among multiple data paths for sending response data corresponding to the transaction ID Master_Tag_ID(n) from the memory device 143 to the master device 120_n, where the specific data path is a data path having maximum transmission efficiency among the multiple data paths. For example, when the attribute Is_unique_ID(n) indicates that the transaction ID Master_Tag_ID(n) is not unique in the system 100 (e.g. Is_unique_ID(n) is "0"), the RRB 142 may receive data corresponding to the transaction ID Master_Tag_ID(n) from the memory device 143, to allow this data to be sent from the slave device 140 to the master device 120_n in the in-order manner (e.g. sent in the predetermined order). In another example, when the attribute Is_unique_ID (n) indicates that the transaction ID Master_Tag_ID(n) is unique in the system 100 (e.g. Is_unique_ID(n) is "1"), the slave device 140 may utilize a bypass path to directly send the response data corresponding to the transaction ID Master_Tag_ID(n) from the memory device 143 to the master device 120_n without transmitting through the RRB 142. This means the data corresponding to the unique ID will not be obstructed (e.g. unable to be sent) due to other data within the RRB 142 being not ready, thereby guaranteeing data response efficiency of the unique ID.

Figure 3:
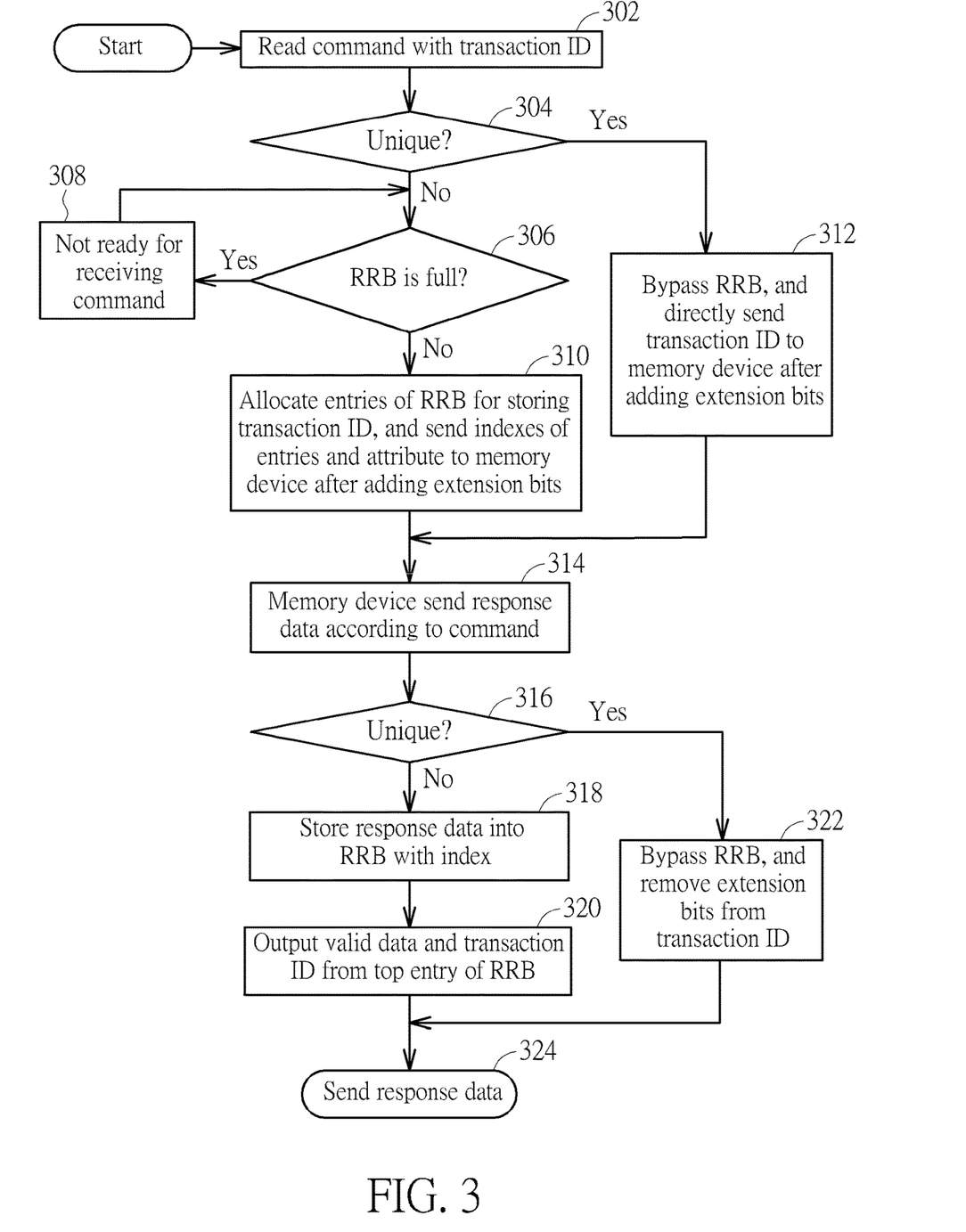
FIG. 3 is a working flow of a method for controlling data response with the aid of at least one attribute of a transaction ID Tag_ID according to an embodiment of the present invention.
Figure 4:
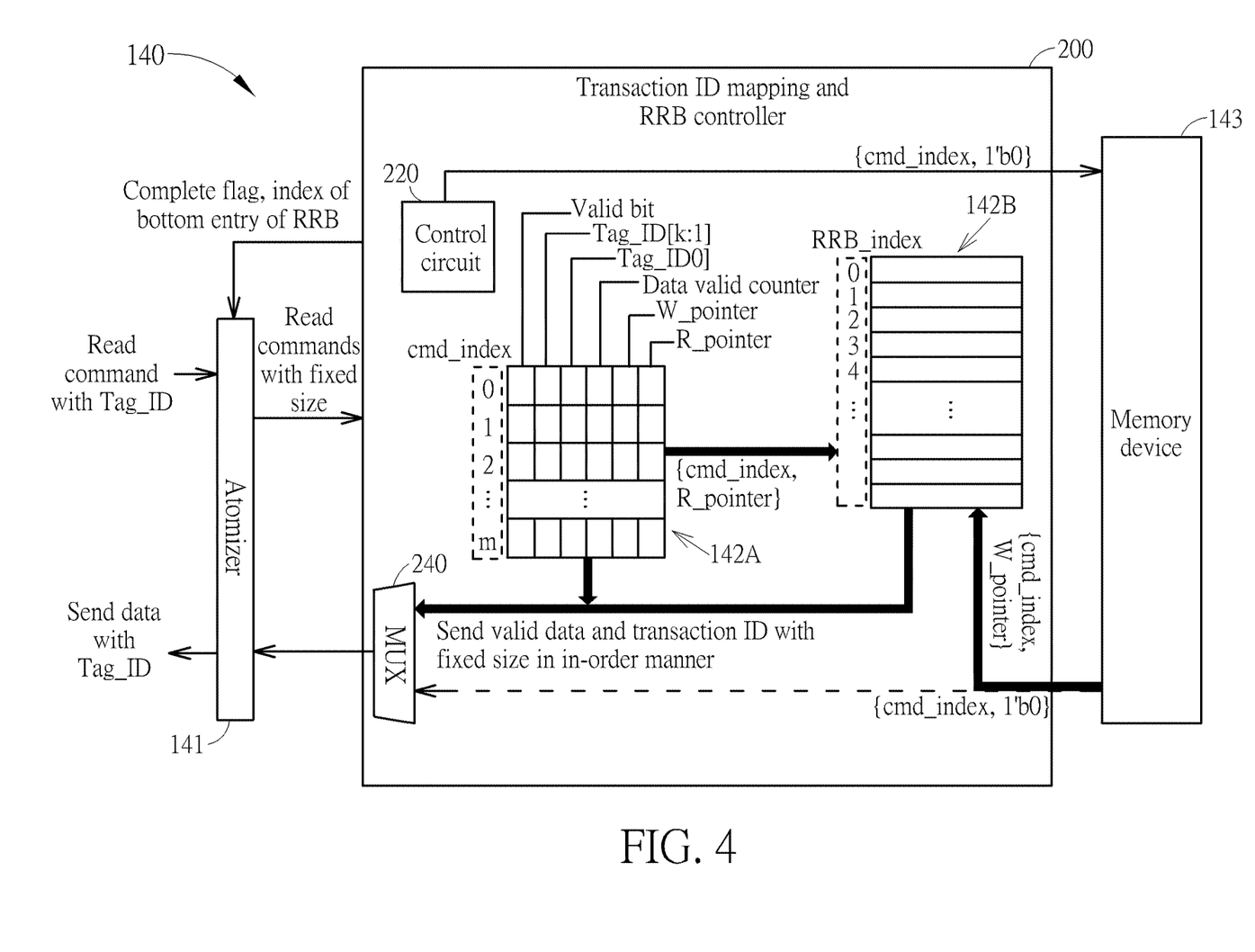
FIG. 4 illustrates some implementation details of a slave device shown in FIG. 2 under a condition where a transaction ID is not unique in the system shown in FIG. 2 according to an embodiment of the present invention.
Figure 5:
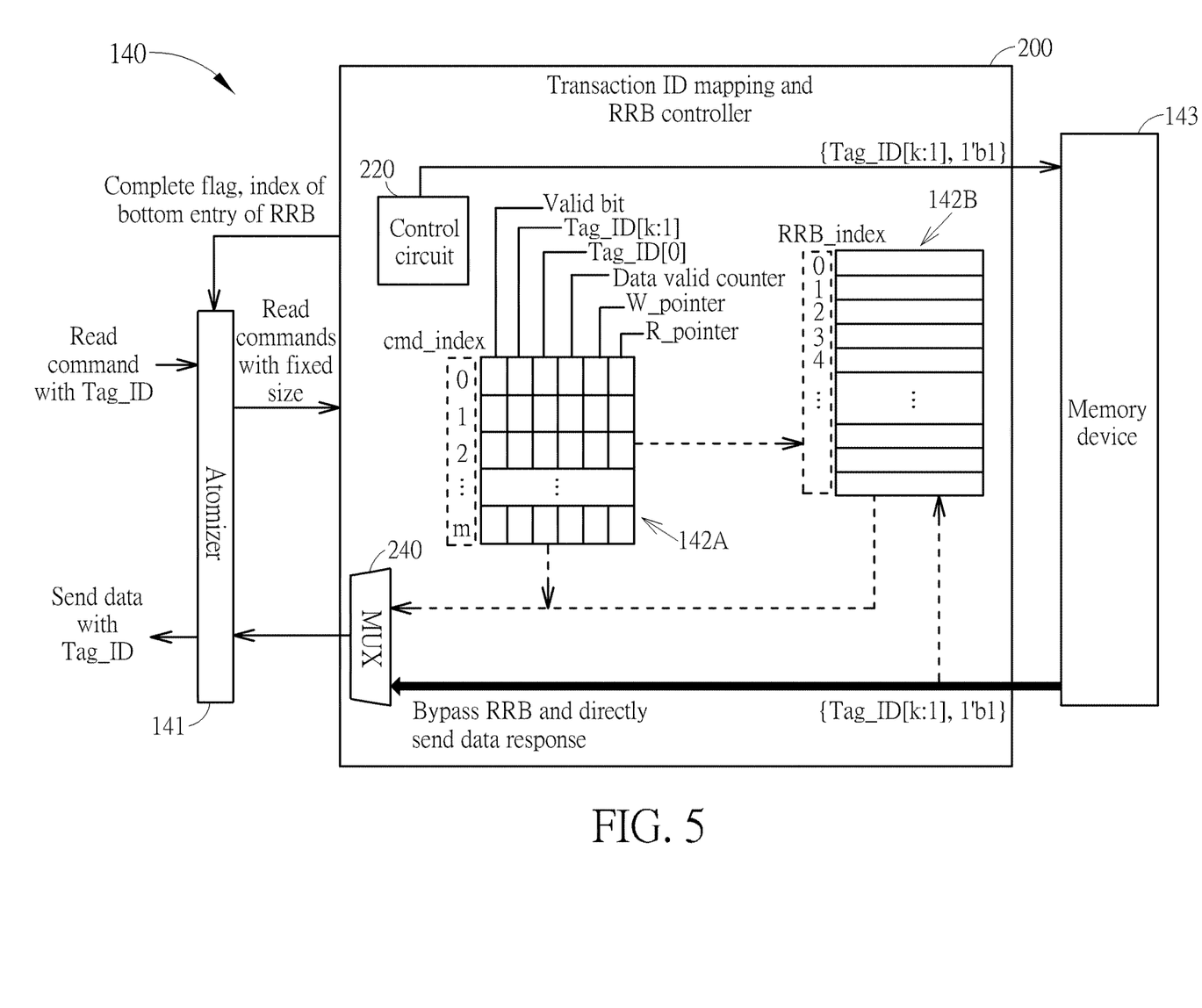
FIG. 5 illustrates some implementation details of the slave device 140 shown in FIG. 2 under a condition where a transaction ID is unique in the system shown in FIG. 2 according to an embodiment of the present invention.

FIG. 3 is a working flow of a method for controlling data response with the aid of at least one attribute of a transaction ID (e.g. a tag ID) Tag_ID according to an embodiment of the present invention. FIG. 4 illustrates some implementation details of the slave device 140 shown in FIG. 2 under a condition where the transaction ID Tag_ID is not unique in the system 100 according to an embodiment of the present invention. FIG. 5 illustrates some implementation details of the slave device 140 shown in FIG. 2 under a condition where the transaction ID Tag_ID is unique in the system 100 according to an embodiment of the present invention. In the embodiments of FIG. 3 to FIG. 5, a width of the transaction ID Tag_ID is less than or equal to a burst length that is utilized by the memory device 143 while performing access control. It should be noted that the working flow shown in FIG. 3 is for illustrative purposes only, and is not a limitation of the present invention, where one or more steps may be added, deleted or modified in the working flow. Furthermore, if a same result may be obtained, these steps do not have to be executed in the exact order shown in FIG. 3. In addition, the transaction ID Tag_ID may be an example of the transaction ID {Master_Tag_ID(n), Master_ID(n), Is_unique_ID(n)} shown in FIG. 2, where a least significant bit (LSB) of the transaction ID Tag_ID (which is represented by Tag_ID[0]) may be an example of Is_unique_ID(n), and other bits of the transaction ID Tag_ID (which is represented by Tag_ID[k:1]) may be an example of {Master_Tag_ID(n), Master_ID(n)}. In addition, the RRB 142 and other associated control circuits may be integrated into a transaction ID mapping and RRB controller 200, and more particularly, the RRB 142 may comprise storage regions 142A and 142B, but the present invention is not limited thereto.

In Step 302, the slave device 140 may read a command with the transaction ID Tag_ID.

In Step 304, the slave device 140 may determine whether the transaction ID Tag_ID is unique in the system 100, e.g. determine whether the transaction ID Tag_ID is unique in the system 100 according to Tag_ID[0]. If the determination is "Yes", the flow enters Step 312; if the determination is "No", the flow enters Step 306.

In Step 306, the slave device 140 may check whether the RRB 142 (e.g. the storage regions 142A and/or 142B) is full. If the determination is "Yes", it means the command cannot be received at this moment, and the flow enters Step 308; if the determination is "No", the flow enters Step 310.

In Step 308, as the slave device 140 (e.g. the RRB 142 therein) is not ready for receiving the command, the flow returns to Step 306 to check again, until the RRB 142 has space.

In Step 310, as Tag_ID[0] indicates that the transaction ID Tag_ID is not unique in the system 100 (e.g. Tag_ID[0] is 1'b0), the slave device 140 may allocate one or more entries of the RRB 142 for storing the transaction ID Tag_ID, and a control circuit 220 within the transaction ID mapping and RRB controller 200 may send indexes cmd_index of the one or more entries and the attribute Tag_ID[0] (e.g. 1'b0) with a read ID {cmd_index, 1'b0} to the memory device 143 after adding extension bits, as shown in FIG. 4. In addition, each of the one or more entries may comprise a valid bit, Tag_ID[k:1], Tag_ID[0], data valid counter, write pointer W_pointer and read pointer R_pointer, but the present invention is not limited thereto.

In Step 312, as Tag_ID[0] indicates that the transaction ID Tag_ID is unique in the system 100 (e.g. Tag_ID[0] is 1'b1), the slave device 140 may bypass the RRB 142, and the control circuit 220 within the slave device 140 may directly send the transaction ID Tag_ID with a read ID{Tag_ID[k:1], 1'b1} to the memory device 143 after adding extension bits, as shown in FIG. 5.

In Step 314, the memory device 143 may send response data according to the received command (e.g. the aforementioned read transaction ID).

In Step 316, the memory device 143 may determine whether a transaction ID corresponding to this data is unique according to an LSB of a response ID. If the determination is "Yes", e.g. the response ID is {Tag_ID[k:1], 1'b1} as shown in FIG. 5, the flow enters Step 322; if the determination is "No", e.g. the response ID is {cmd_index, 1'b0} as shown in FIG. 4, the flow enters Step 318.

In Step 318, the slave device 140 may store the response data into the storage region 142B within the RRB 142 with an RRB write index {cmd_index, W_pointer} (which may correspond to an index RRB_index of the storage region 142B), as shown in FIG. 4.

In Step 320, the slave device 140 may output valid data and the transaction ID Tag_ID from a top entry of the RRB 142 (e.g. the storage region 142A and/or 142B) through a selecting circuit 240 (labeled "MUX" for brevity) within the transaction ID mapping and RRB controller 200, e.g. read the valid data from the storage region 142B according to an RRB read index {cmd_index, R_pointer}, as shown in FIG. 4.

In Step 322, the slave device 140 may bypass the RRB 142, and remove the extension bits from the transaction ID. The selecting circuit 240 utilizes a bypass path to directly output the transaction ID Tag_ID and the response data from the memory device 143 without transmitting through the RRB 142 (i.e. the data will not enter the RRB 142), as shown in FIG. 5.

In Step 324, the slave device 140 may send the response data to a master device (e.g. the master device 120_n).

As mentioned above, as the memory device 143 performs access control with the fixed burst length and a wide width transaction ID (e.g. the width of the transaction ID Tag_ID is less than or equal to a transaction ID width utilized by the memory device 140 while performing access control), if the transaction ID Tag_ID is unique (Tag_ID[0] is 1'b1) in the system 100, the transaction ID mapping and RRB controller 200 can directly transmit the transaction ID Tag_ID to the memory device 143 without storing the transaction ID Tag_ID into the RRB 142 (e.g. the storage region 142A), and directly send the response data corresponding to the transaction ID Tag_ID from the memory device 142 to the master device 120_n without transmitting through the RRB 142. Thus, when the transaction ID Tag_ID is unique in the system 100, the slave device 140 can send response data with an optimal efficiency without being obstructed due to waiting for data within the RRB 142.

Figure 6:
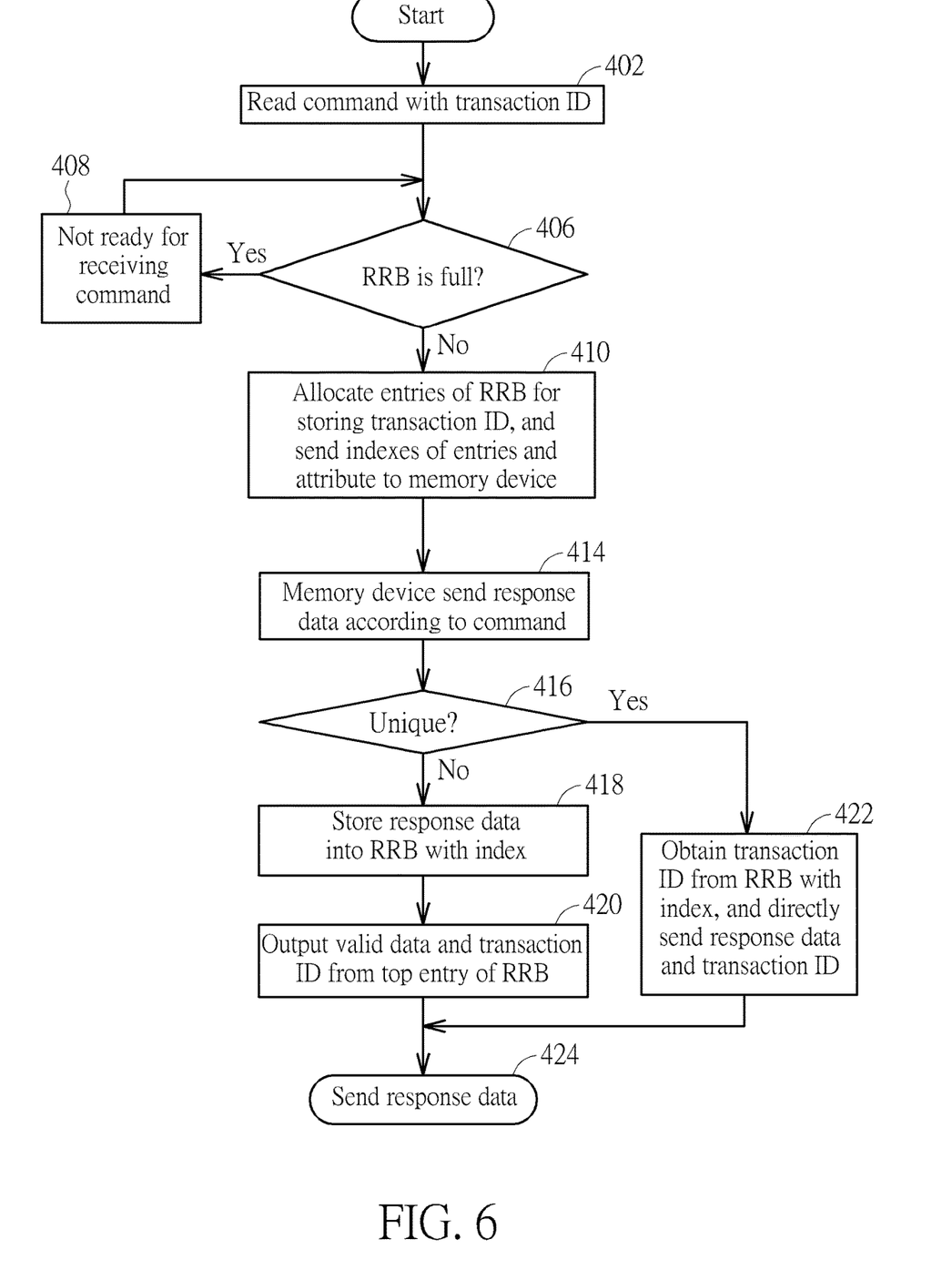
FIG. 6 is a working flow of a method for controlling data response with the aid of at least one attribute of a transaction ID according to an embodiment of the present invention.
Figure 7:
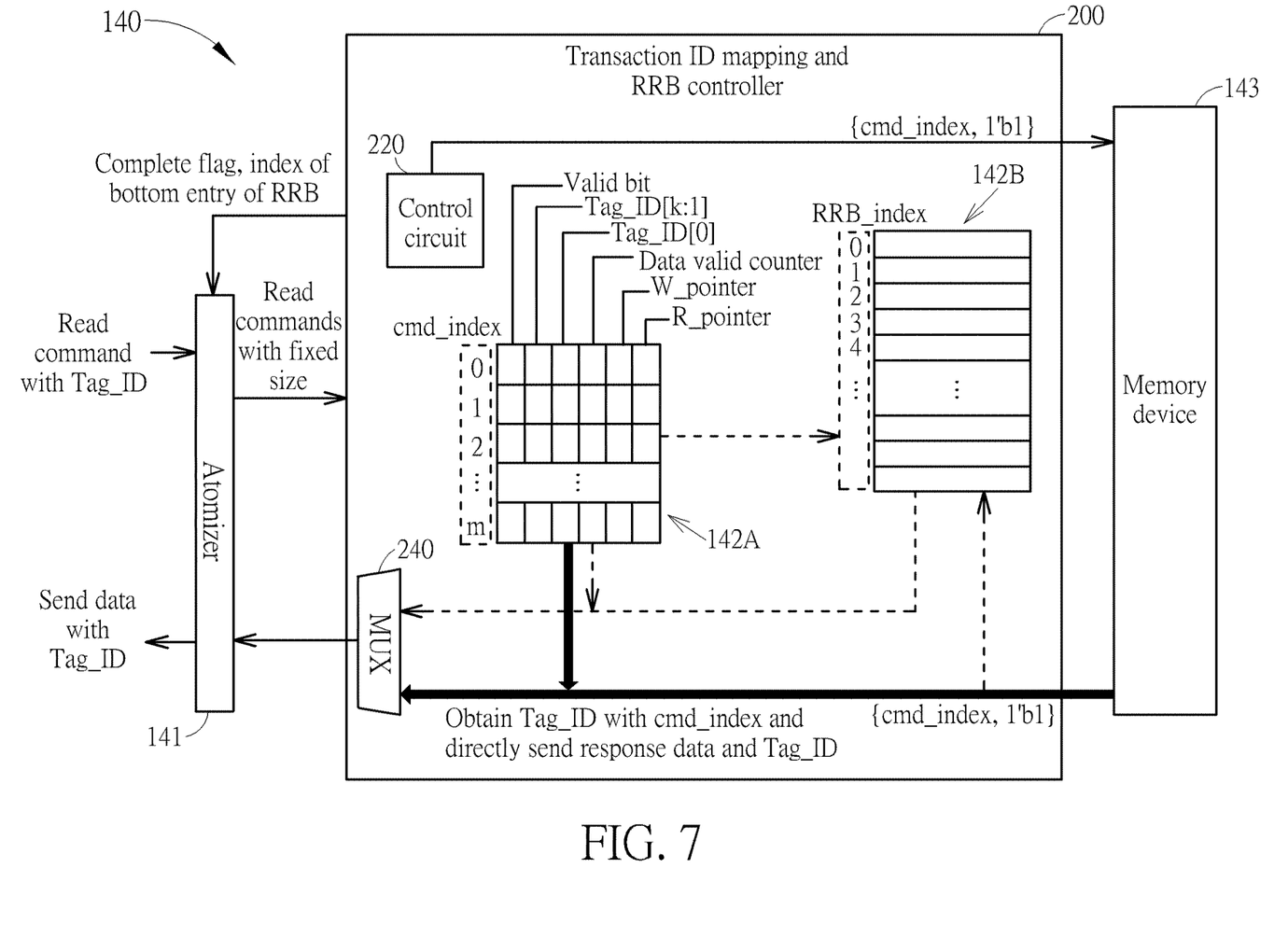
FIG. 7 illustrates some implementation details of a slave device shown in FIG. 2 under a condition where a transaction ID is unique in the system shown in FIG. 2 according to an embodiment of the present invention.

FIG. 6 is a working flow of a method for controlling data response with the aid of at least one attribute of the transaction ID Tag_ID according to an embodiment of the present invention. In this embodiment, the width of the transaction ID Tag_ID is greater than a transaction ID width utilized by the memory device 140 while performing access control. It should be noted that the working flow shown in FIG. 6 is for illustrative purposes only, and is not a limitation of the present invention, where one or more steps may be added, deleted or modified in the working flow. Furthermore, if a same result may be obtained, these steps do not have to be executed in the exact order shown in FIG. 6. FIG. 7 illustrates some implementation details of the slave device 140 shown in FIG. 2 under the condition where the transaction ID Tag_ID is unique in the system 100 according to an embodiment of the present invention. In addition, when the width of transaction ID Tag_ID is greater than the transaction ID width utilized by the memory device 140 while performing access control, implementation details of the slave device 140 under the condition where the transaction ID Tag_ID is not unique in the system 100 may be known by referring to FIG. 4.

In Step 402, the slave device 140 may read a command with the transaction ID Tag_ID.

In Step 406, the slave device 140 may check whether the RRB 142 (e.g. the storage regions 142A and/or 142B) is full. If the determination is "Yes", it means the command cannot be received at this moment, and the flow enters Step 408; if the determination is "No", the flow enters Step 410.

In Step 408, as the slave device 140 (e.g. the RRB 142 therein) is not ready for receiving the command and sending corresponding response data, the flow returns to Step 406 to check again, until the RRB 142 has space.

In Step 410, regardless of whether the transaction ID Tag_ID is unique in the system 100, the slave device 140 may allocate the one or more entries of the RRB 142 for storing the transaction ID Tag_ID, and the control circuit 220 may send the indexes cmd_index of the one or more entries and the attribute Tag_ID[0] (e.g. 1'b0 or 1'b1) with a read ID {cmd_index, Tag_ID[0]} to the memory device 143. For example, the control circuit 220 sends {cmd_index, 1'b0}, as shown in FIG. 4. In another example, the control circuit 220 sends {cmd_index, 1'b1}, as shown in FIG. 7.

In Step 414, the memory device 143 may send response data according to the received command (e.g. the aforementioned read ID).

In Step 416, the memory device 143 may determine whether a transaction ID corresponding to this data is unique according to an LSB of a response ID. If the determination is "Yes", e.g. the response ID is {cmd_index, 1'b1} as shown in FIG. 7, the flow enters Step 422; if the determination is "No", e.g. the response ID is {cmd_index, 1'b0} as shown in FIG. 4, the flow enters Step 418.

In Step 418, the slave device 140 may store the response data into the storage region 142B within the RRB 142 with the RRB write index {cmd_index, W_pointer} (which may correspond to an index RRB_index of the storage region 142B), as shown in FIG. 4.

In Step 420, the slave device 140 may output valid data and the transaction ID Tag_ID from a top entry of the RRB 142 (e.g. the storage region 142A and/or 142B) through the selecting circuit 240 within the transaction ID mapping and RRB controller 200, e.g. read the valid data from the storage region 142B according to the RRB read index {cmd_index, R_pointer}, as shown in FIG. 4.

In Step 422, the slave device 140 may utilize the index cmd_index to obtain the transaction ID Tag_ID from the RRB 142 (e.g. the storage region 142A therein), and directly send the transaction ID Tag_ID and the data corresponding to the transaction ID Tag_ID without transmitting the data through the RRB 142 (i.e. the data will not enter the RRB 142 (e.g. the storage region 142B therein)), as shown in FIG. 7

In Step 424, the slave device 140 may send the response data to a master device (e.g. the master device 120_n).

As mentioned above, as the memory device 143 performs access control with the fixed burst length and a narrow width transaction ID (e.g. the width of the transaction ID Tag_ID is greater than a transaction ID width utilized by the memory device 140 while performing access control), if the transaction ID Tag_ID is unique (Tag_ID[0] is 1'b1) in the system 100, the atomizer 141 can chop the transaction ID to generate multiple transaction commands with the fixed burst length (e.g. read commands with a fixed size/length), to allow the transaction ID mapping and RRB controller 200 to store the transaction ID Tag_ID into the RRB 142 (e.g. the storage region 142A). The transaction ID mapping and RRB controller 200 utilizes the multiple transaction commands to obtain the data corresponding to the read transaction ID from the memory device 143, and further utilizes the specific data path (e.g. the bypass path) to send the transaction ID Tag_ID stored in the storage region 142A within the RRB 142 in conjunction with the data corresponding to the transaction ID Tag_ID to the master device 120_N. Thus, when the transaction ID Tag_ID is unique in the system 100, the slave device 140 can send response data with optimal efficiency without being obstructed due to waiting for data within the RRB 142.

Figure 8:
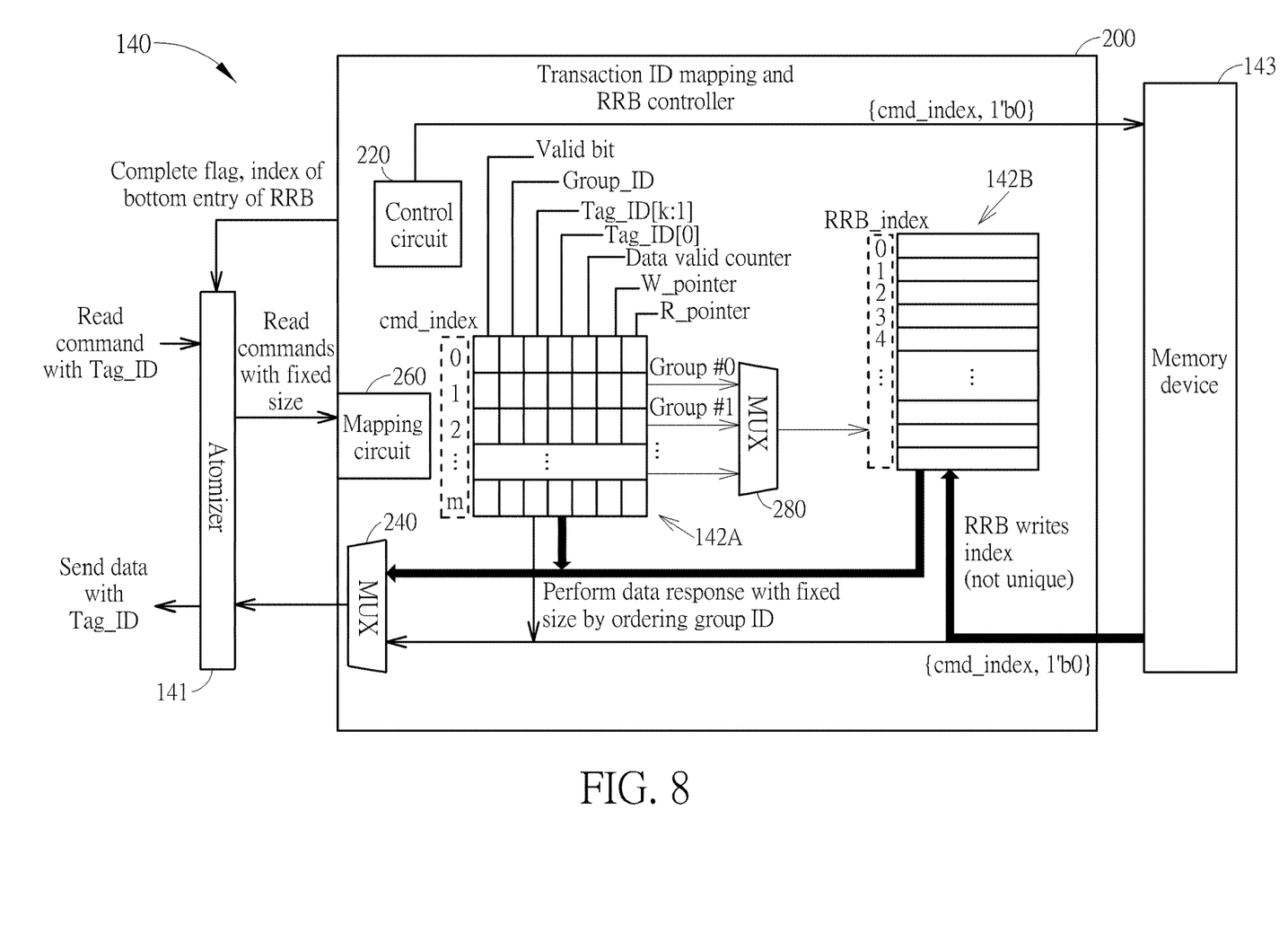
FIG. 8 illustrates some implementation details of the slave device 140 shown in FIG. 2 under a condition where a transaction ID is not unique in the system shown in FIG. 2 according to an embodiment of the present invention.

In addition to the attribute Is_unique_ID(n), the slave device 140 may further refer to the attribute Master_ID(n) to control the data response. For example, some transaction IDs are not unique in the system, but if these transaction IDs are from different master devices (e.g. the attributes Master_ID(n) of these transaction IDs are different from one another), response data corresponding to these transaction IDs may be re-ordered. FIG. 8 illustrates some implementation details of the slave device 140 shown in FIG. 2 under the condition where the transaction ID Tag_ID is unique in the system 100 according to an embodiment of the present invention.

In Step 410, the slave device 140 may allocate the one or more entries of the RRB 142 and perform grouping according to the attribute Master_ID(n) (e.g. mapping the attribute Master_ID(n) to a group ID Group_ID through a mapping circuit 260 within the transaction ID mapping and RRB controller 200, as shown in FIG. 8) to utilize the index cmd_index to store the transaction ID Tag_ID and the group ID Group_ID, and the control circuit 220 may send the indexes cmd_index of the one or more entries and the attribute Tag_ID[0] (e.g. 1'b0 or 1'b1) to the memory device 143 with the read ID {cmd_index, Tag_ID[0]}. In addition, in Step 420, the slave device 140 may select a corresponding group among multiple groups within the storage region 142B according to the group ID Group_ID through a selecting circuit 280 (labeled "MUX" for brevity) within the transaction ID mapping and RRB controller 200, and further may utilize the selecting circuit 240 to output valid data and the transaction ID Tag_ID from one of the top entry of each group of the RRB 142 (e.g. the corresponding group within the storage region 142A and/or 142B), as shown in FIG. 8.

As mentioned above, as the RRB 142 may be grouped into multiple groups respectively corresponding to the master devices 120_1, . . . and 120_N, data response operations of transaction IDs from different master devices may be performed independently. Thus, when the slave device 149 receives multiple read commands from different master devices, corresponding response data can be re-ordered to achieve the optimal performance.

In addition, in some embodiments, the transmission interface circuit 160 shown in FIG. 2 may comprise multiple data paths, and the multiple data paths may comprise a dedicated data path (which may be an example of the aforementioned specific data path) dedicated to transmit data corresponding to unique IDs.

In addition, in the above embodiments, the at least one attribute (e.g. the attribute Is_unique_ID(n)) is transmitted by an extension field (e.g. Tag_ID[0]) of the transaction ID. In other embodiments, the at least one attribute may be transmitted by a sideband channel. Any transmitting path which can send information related to attribute(s) of the transaction ID (e.g. related to whether the transaction ID is unique in the system 100) for the slave device to determine whether to provide a dedicated channel for response data should belong to the scope of the present invention.

To summarize, when the master device 120__n_ transmits a command, attribute information thereof is also transmitted to the slave device 140, to allow the slave device 140 to provide a corresponding data response path according to the attribute information, thereby achieving optimal performance. For example, when a portion of the attribute information indicates that a transaction ID of the command is unique in a system, data corresponding to the command may be sent through a dedicated signal path. In another example, when the portion of the attribute information indicates that the transaction ID of the command is not unique in the system, the slave device 140 may further determine which master device the command is sent from according to another portion of the attribute information, to allow response data requested by different master devices to be sent in an out-of-order manner. Thus, the present invention can fully use the advantage of out-of-order data response, to enhance overall performance of the system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling data response with the aid of at least one attribute of a transaction identifier (ID), comprising:
    transmitting the at least one attribute in conjunction with the transaction ID from any master device among one or more master devices to a slave device; and
    according to the at least one attribute, determining whether to utilize a specific data path among multiple data paths for sending response data corresponding to the transaction ID from a memory device within the slave device to said any master device;
    wherein the specific data path is a data path having maximum transmission efficiency among the multiple data paths;
    wherein the slave device comprises a read re-order buffer (RRB) configured to make out-of-order response data from the memory device be sent from the slave device to said any master device in an in-order manner; and the specific data path comprises a bypass path configured to directly send the response data corresponding to the transaction ID from the memory device to said any master device without transmitting through the RRB.

2. The method of claim 1, wherein the at least one attribute indicates whether the transaction ID is unique in a whole system, and the whole system comprises the one or more master device and the slave device.

3. The method of claim 1, further comprising:
    in response to the memory device performing access control with a fixed burst length and wide transaction ID width, and the at least one attribute indicating that the transaction ID is unique in the whole system, directly transmitting the transaction ID to the memory device without storing the transaction ID into the RRB.

4. The method of claim 1, further comprising:
    in response to the memory device performing access control with a fixed burst length and narrow transaction ID width, chopping the transaction ID to generate multiple transaction commands with the fixed burst length, and storing the transaction ID into the RRB;
    utilizing the multiple transaction commands to obtain the data corresponding to the read transaction ID from the memory device; and
    utilizing the specific data path to send the transaction ID stored in the RRB in conjunction with the data corresponding to the transaction ID to said any master device.

5. The method of claim 2, wherein said any master device and the slave device is coupled to each other through a transmission interface circuit, the transmission interface comprises the multiple data paths, and the specific data path is dedicated to response data corresponding to unique transaction IDs.

6. The method of claim 1, wherein the at least one attribute is transmitted by an extension field of the transaction ID.

7. The method of claim 1, wherein the at least one attribute is transmitted by a sideband channel.

8. The method of claim 1, wherein the at least one attribute indicates that the transaction ID corresponds to said any master device among the one or more master devices.

9. A system for controlling data response with aid of at least one attribute of a transaction identifier (ID), comprising:
    a slave device, comprising a memory device configured for storing data; and
    one or more master devices, coupled to the slave device through a transmission interface circuit, configured to obtain the data stored in the memory device;
    wherein:
        any master device among the one or more master devices transmits the at least one attribute in conjunction with the transaction ID to the slave device; and
        according to the at least one attribute, the slave device determines whether to utilize a specific data path among multiple data paths for sending response data corresponding to the transaction ID from the memory device to said any master device;
        wherein the specific data path is a data path having maximum transmission efficiency among the multiple data paths;
    wherein:
        the slave device comprises:
            a read re-order buffer (RRB), coupled to the memory device, configured to make out-of-order response data from the memory device be sent from the slave device to said any master device in an in-order manner; and
        the specific data path comprises:
            a bypass path, configured to directly send the data corresponding to the transaction ID from the memory device to said any master device without transmitting through the RRB.

10. The system of claim 9, wherein the at least one attribute indicates whether the transaction ID is unique in a whole system, and the whole system comprises the one or more master device and the slave device.

11. The system of claim 9, wherein when the memory device performs access control by a fixed burst length with wide transaction ID width, and the at least one attribute indicates that the transaction ID is unique in the whole system, the slave device directly transmits the transaction ID to the memory device without storing the transaction ID into the RRB.

12. The system of claim 9, wherein when the memory device performs access control by a fixed burst length with narrow transaction ID width, the slave device chops the transaction ID to generate multiple transaction commands with the fixed burst length, and stores the transaction ID into the RRB; the slave device utilizes the multiple transaction commands to obtain the data corresponding to the read transaction ID from the memory device; and the slave device utilizes the specific data path to send the transaction ID stored in the RRB in conjunction with the data corresponding to the transaction ID to said any master device.

13. The system of claim 10, wherein the transmission interface comprises the multiple data paths, and the specific data path is dedicated to send response data corresponding to unique transaction IDs.

14. The system of claim 9, wherein the at least one attribute is transmitted by an extension field of the transaction ID.

15. The system of claim 9, wherein the at least one attribute is transmitted by a sideband channel.

16. The system of claim 9, wherein the at least one attribute indicates that the transaction ID corresponds to said any master device among the one or more master devices.

* * * * *